United States Patent
Bruder et al.

(10) Patent No.: US 12,276,588 B2
(45) Date of Patent: Apr. 15, 2025

(54) SYSTEMS AND METHODS FOR MEASURING EFFECTS OF VIBRATION ON RHEOMETRIC PROPERTIES OF A FLUID

(71) Applicant: GM GLOBAL TECHNOLOGY OPERATIONS LLC, Detroit, MI (US)

(72) Inventors: Dmitriy Bruder, Clinton Township, MI (US); Robin James, Rochester Hills, MI (US); Megan E. McGovern, Detroit, MI (US); Robert H. Dietze, Jr., Brighton, MI (US); Christopher Brady, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 188 days.

(21) Appl. No.: 18/084,091

(22) Filed: Dec. 19, 2022

(65) Prior Publication Data

US 2024/0201061 A1 Jun. 20, 2024

(51) Int. Cl.
*G01N 11/02* (2006.01)
*G01N 11/00* (2006.01)

(52) U.S. Cl.
CPC ...... *G01N 11/02* (2013.01); *G01N 2011/0026* (2013.01); *G01N 2011/0073* (2013.01)

(58) Field of Classification Search
CPC .. G01N 11/02; G01N 11/16; G01N 2011/002; G01N 2011/0026; G01N 2011/0073
See application file for complete search history.

(56) References Cited

U.S. PATENT DOCUMENTS

| 3,649,358 | A | | 3/1972 | Kenneth |
| 3,746,027 | A | | 7/1973 | Elliott |
| 4,941,346 | A | * | 7/1990 | Suzuki ................. G01N 11/16 73/54.41 |
| 5,690,145 | A | | 11/1997 | Kuklinski et al. |
| 5,797,414 | A | | 8/1998 | Sirovich et al. |
| 5,884,650 | A | | 3/1999 | Ruffa |
| 6,026,839 | A | | 2/2000 | Kriebel et al. |
| 8,396,676 | B2 | * | 3/2013 | Zozulya ................. G01N 11/16 702/50 |
| 11,358,328 | B2 | | 6/2022 | Okonski et al. |
| 11,740,206 | B2 | | 8/2023 | Giurgiutiu et al. |
| 11,982,660 | B2 | | 5/2024 | Ardanese et al. |
| 12,098,990 | B2 | * | 9/2024 | Jhe ......................... G01N 11/16 |
| 2007/0084272 | A1 | * | 4/2007 | Wang ..................... G01N 11/04 73/54.11 |
| 2015/0052981 | A1 | * | 2/2015 | Kim ...................... G01N 29/032 73/54.41 |
| 2020/0166444 | A1 | * | 5/2020 | Anklin ................... G01N 11/16 |

FOREIGN PATENT DOCUMENTS

| JP | 2004012149 A | * | 1/2004 |
| KR | 20140050438 A | | 4/2014 |

* cited by examiner

*Primary Examiner* — Andre J Allen

(57) ABSTRACT

A system for measuring effects of vibration on rheometric properties of a fluid sample. The system includes a receptacle configured to hold the fluid sample and receive a probe extending from a rheometric measuring device. A vibration generator is configured to vibrate the fluid sample within the receptacle while the rheometric measuring device measures the rheometric properties of the fluid sample. A vibration control module is configured to control frequency at which the vibration generator vibrates.

20 Claims, 7 Drawing Sheets

SYSTEMS AND METHODS FOR MEASURING EFFECTS OF VIBRATION ON RHEOMETRIC PROPERTIES OF A FLUID

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for measuring effects of vibration on rheometric properties of a fluid.

Non-Newtonian fluids do not follow Newton's law of viscosity (i.e., constant viscosity independent of stress). For non-Newtonian fluids, viscosity can change when under force, such as vibrational forces, to either more liquid or more solid. In automotive applications, examples of non-Newtonian fluids include, but are not limited to, structural adhesives, thermal interface materials for battery module assembly, and transmission fluids. The present disclosure includes systems and methods for measuring viscosity and other rheometric properties of non-Newtonian fluids, as well as any other fluids, while subject to vibration.

SUMMARY

In a feature, the present disclosure includes a system for measuring effects of vibration on rheometric properties of a fluid sample. The system includes a receptacle configured to hold the fluid sample and receive a probe extending from a rheometric measuring device. A vibration generator is configured to vibrate the fluid sample within the receptacle while the rheometric measuring device measures the rheometric properties of the fluid sample. A vibration control module is configured to control frequency at which the vibration generator vibrates.

In further features, a fixture is configured to support the receptacle and the vibration generator.

In further features, the vibration generator includes a vibration shaker having a vibration rod configured to contact an exterior of the receptacle to vibrate the receptacle.

In further features, the vibration rod is configured to contact a bottom of the receptacle.

In further features, the vibration rod is configured to contact a side of the receptacle.

In further features, the vibration generator includes a vibration shaker and a vibration disc supported within the receptacle by a vibration rod extending through a bottom of the receptacle.

In further features, the vibration generator includes a transducer and an acoustic waveguide extending from the transducer into the receptacle, the transducer is configured to generate at least one of longitudinal acoustic waves, flexural acoustic waves, shear acoustic waves, and torsional acoustic waves.

In further features, the vibration generator includes a normal beam, shear transducer in contact with a side of the receptacle.

In further features, the vibration generator includes an angle beam transducer in contact with a side of the receptacle.

In further features, a heater is configured to heat the fluid sample within the receptacle.

In further features, the heater includes a heating coil extending from a heat source into the receptacle to heat the fluid sample.

In further features, the heater includes a hot plate on which the receptacle is seated.

In further features, the present disclosure includes a cool plate on which the receptacle is seated, the cool plate configured to cool the fluid sample.

In further features, the rheometric measuring device is one of a rheometer and a viscometer.

In a feature, the present disclosure includes a system for measuring effects of vibration on rheometric properties of a fluid sample. The system includes a receptacle configured to hold the fluid sample and receive a probe extending from a rheometric measuring device. A vibration generator is configured to vibrate the fluid sample within the receptacle while the rheometric measuring device measures the rheometric properties of the fluid sample. The system further includes a fixture to which the vibration generator is mounted. The fixture includes a support configured to hold the receptacle relative to the vibration generator such that vibration generated by the vibration generator is transferred to the fluid sample. A vibration control module is configured to control frequency at which the vibration generator vibrates.

In further features, the vibration generator includes a vibration shaker mounted to the fixture below the base.

In further features, the vibration shaker includes a vibration rod configured to contact a bottom of the receptacle to vibrate the receptacle and the fluid sample therein.

In further features, the vibration generator includes a vibrating disc supported within the receptacle by a vibration rod extending through a bottom of the receptacle.

In a feature, the present disclosure includes, a method for measuring effects of vibration on rheometric properties of a fluid sample. The method includes the following: loading the fluid sample into a receptacle; inserting into the fluid sample a probe of a rheometric measuring device configured to measure the rheometric properties of the fluid sample; setting vibration frequency of a vibration generator configured to vibrate the fluid sample within the receptacle while the rheometric measuring device measures rheometric properties of the sample; and measuring with the rheometric measuring device the rheometric properties of the fluid sample while the fluid sample is vibrated by the vibration generator at the set vibration frequency.

In further features, the method includes heating the fluid sample while measuring the rheometric properties of the fluid sample.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
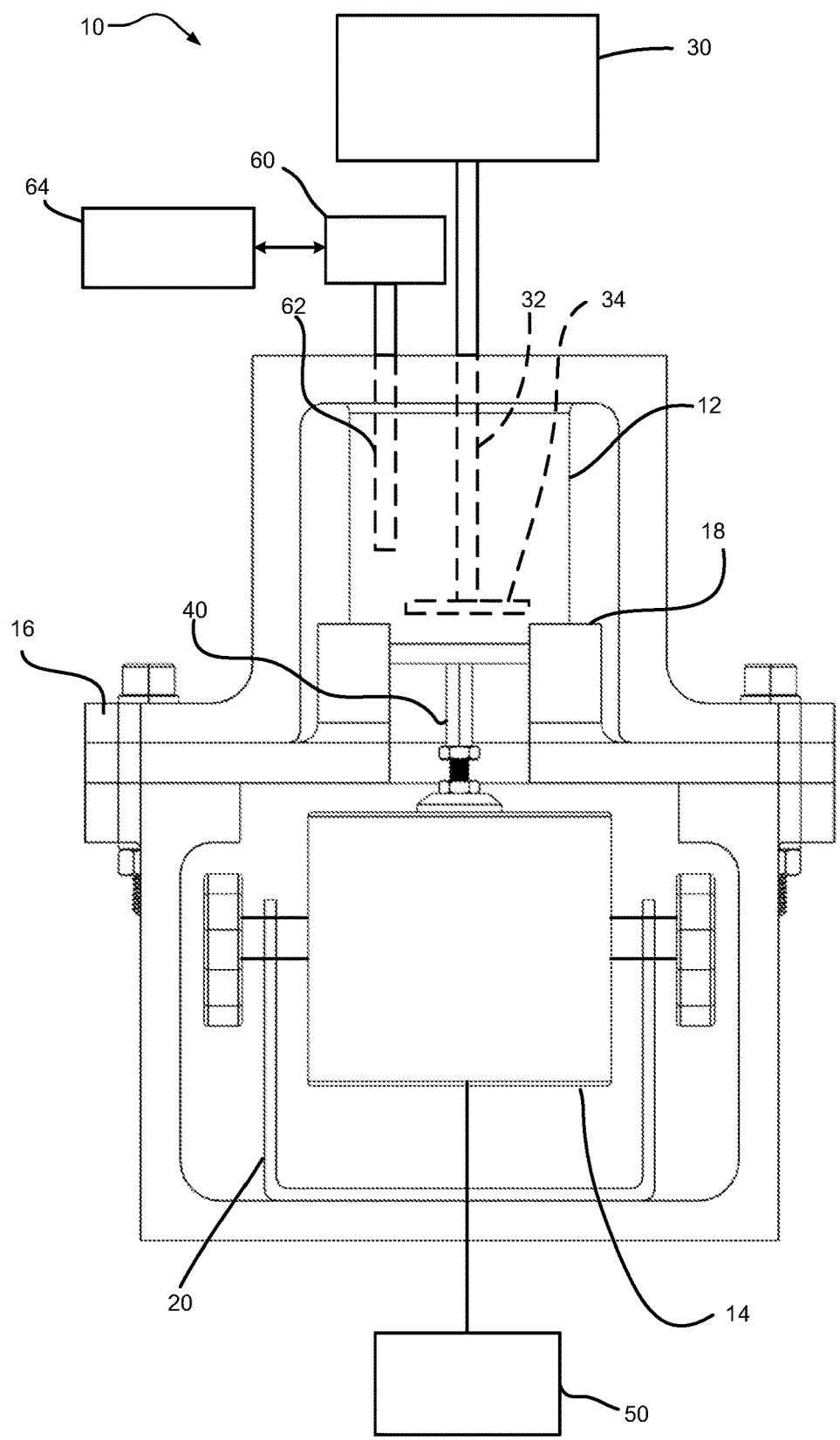
FIG. 1 is a side view of an exemplary system in accordance with the present disclosure for measuring effects of vibration and temperature change on rheometric properties of a fluid sample.
Figure 2:
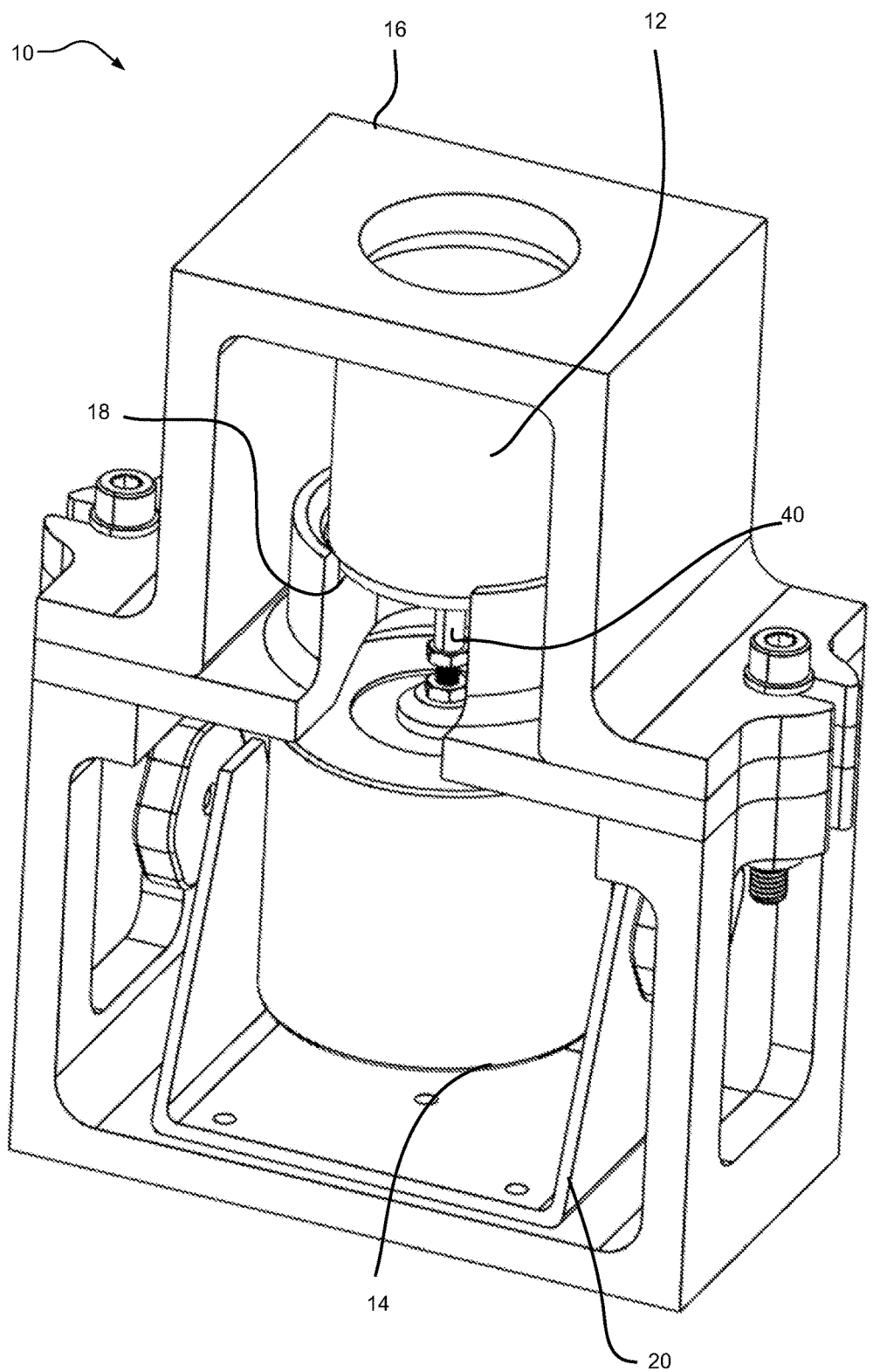
FIG. 2 is a perspective view of the system of FIG. 1.

FIGS. 1 and 2 illustrate an exemplary system 10 for measuring effects of vibration on rheometric properties of a fluid sample, such as the effects of acoustic agitation on the viscosity and flowability of shear thinning and thickening non-Newtonian fluids, for example. With respect to automotive applications, for example, the system 10 is configured to quantify parameters of an acoustic wave (e.g., frequency, amplitude, etc.) that will increase the flowability of shear thinning structural adhesives and thermal interface materials used for battery module assembly, for example. Increasing the flowability of such materials makes it easier to apply the materials, which have a very high viscosity in the absence of vibration. As explained herein, the system 10 is also configured to measure the effects of temperature fluctuations on a fluid sample as the fluid is acoustically agitated. The system 10 is suitable for analyzing the effects of vibration and temperature on the rheometric properties of fluids used in non-automotive applications as well.

With reference to FIGS. 1 and 2, the system 10 generally includes a receptacle 12 and a vibration generator 14 configured to vibrate, such as through acoustical agitation, a fluid sample within the receptacle 12. The receptacle 12 may be a cup or any other suitable container configured to hold a sufficient quantity of the fluid sample. The vibration generator 14 is any suitable device or assembly configured to generate vibrations for acoustically agitating or exciting the fluid sample while rheometric properties thereof are measured. For example, the vibration generator 14 may be a vibration shaker as illustrated in FIGS. 1-4. Any suitable vibration shaker may be used, such as any suitable modal shaker, vibration test shaker, shaker table, etc. The vibration generator 14 may alternatively include any suitable transducer 80, 90, 110 illustrated in FIGS. 5-10, for example, as described further herein.

The system 10 includes a fixture 16 to which the vibration generator 14 is mounted. The fixture 16 also includes a support 18 configured to hold the receptacle 12 relative to the vibration generator 14 such that vibration generated by the vibration generator 14 is transferred to the fluid sample within the receptacle 12. The fixture 16 further includes a mount 20 for affixing the vibration generator 14 to the fixture 16. The fixture 16 thus facilitates transportation of various components of the system 10 and maintains the position of the receptacle 12 relative to the vibration generator 14 during operation of the vibration generator 14.

The system 10 further includes a rheometric measuring device 30. The rheometric measuring device 30 is any device suitable for measuring rheometric properties of the sample, such as viscosity, elasticity, shear, etc. The rheometric measuring device 30 may be any suitable viscometer or rheometer, for example. In the example illustrated, the rheometric measuring device 30 measures viscosity and elasticity by measuring drag of the sample. The rheometric measuring device 30 includes a probe 32 with a disc 34. The rheometric measuring device 30 is arranged such that the probe 32 extends into the receptacle 12 and the disc 34 is seated within the sample. During testing, the rheometric measuring device 30 applies a controlled cyclical force to the probe 32, and the resultant shear force on the disc 34 submerged in the fluid sample is measured using, for example, a load cell of the rheometric measuring device 30.

During testing, the vibration generator 14 acoustically agitates the sample therein. In the example of FIGS. 1 and 2, the vibration generator 14 indirectly excites the sample by vibrating the receptacle 12 with a vibration rod 40, which extends to the bottom of the receptacle 12. When the vibration generator 14 is activated, the vibration rod 40 taps the bottom of the receptacle 12 to acoustically excite the sample at a set frequency and amplitude. The frequency and amplitude is set using a vibration control module 50, which is in communication with the vibration generator 14 and configured to receive user inputs indicating the desired frequency and amplitude of vibration for the sample.

The system 10 is also configured to measure the effects of temperature change on the rheometric properties of the sample being acoustically stimulated. In the example of FIG. 1, the system 10 includes a heat source 60, which may be any suitable heat source for heating the sample as the sample is acoustically stimulated. For example, the heat source 60 may be any suitable electric heater with a heating coil 62 extending therefrom into the receptacle 12 to the sample. In addition to the heat source 60, any suitable cooling mechanism may be included, as explained further herein. A temperature control module 64 is configured to control the temperature of the heat source 60 and any suitable cooling mechanism. For example, the temperature control module 64 may be configured to receive an input from a user indicating a requested temperature for the sample to be tested at, and configured to then set the coil 62, or any other heating or cooling element, to the requested temperature.

Figure 3:
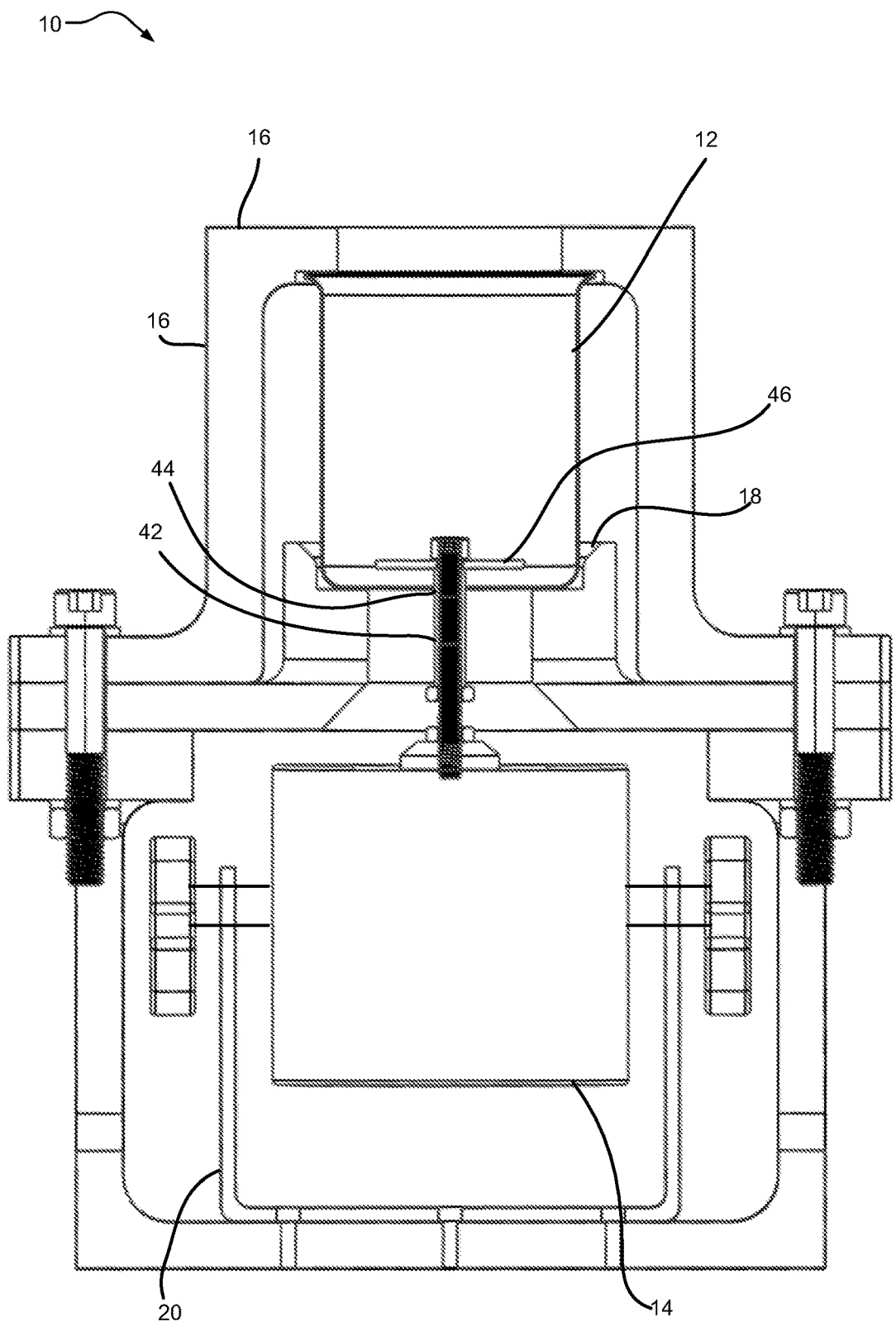
FIG. 3 is a side view of the system of FIG. 1 including an alternate vibration generator.

FIG. 3 illustrates the system 10 with the vibration generator 14 configured in an alternate manner. In the example of FIG. 3, the vibration generator 14 includes a vibration rod 42 extending through an opening 44 defined at a bottom of the receptacle 12. The opening 44 is sealed in any suitable manner to prevent the sample from flowing out through the opening 44. The vibration rod 42 supports a vibration disc 46 within the receptacle 12, which is on or submerged in the sample being tested. The vibration generator 14 is configured as a shaker that vibrates the vibration disc 46, which acoustically excites the sample. The frequency and amplitude of vibration is set by the vibration control module 50.

Figure 4:
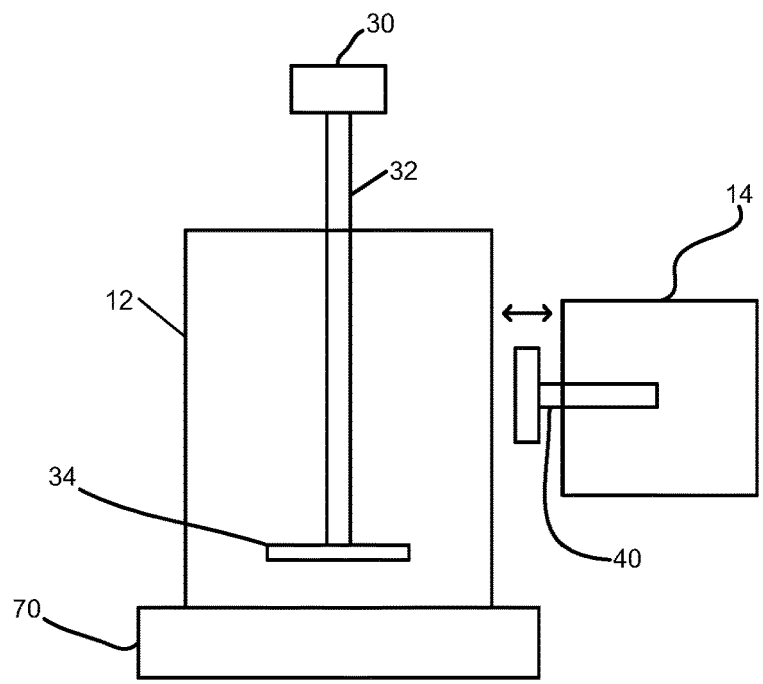
FIG. 4 is a schematic view of an alternate vibration generator and temperature control device in accordance with the present disclosure for the system of FIG. 1.

FIG. 4 illustrates another exemplary arrangement for the vibration generator 14. In the example of FIG. 4, the vibration generator 14 of FIG. 1 is positioned such that the vibration rod 40 is movable to contact a side of the receptacle 12. The fixture 16 may be modified in any suitable manner to support the vibration generator 14 at a side of the receptacle 12. The example of FIG. 4 also includes a heating/cooling plate 70 configured to heat or cool the sample being tested as it is acoustically excited by the vibration generator 14. The heating/cooling plate 70 may be seated on the support 18 of the fixture 16. The receptacle 12 is seated on the heating/cooling plate 70 to heat or cool the sample to a desired temperature in order to measure how different temperatures effect the rheometric properties of the sample as the sample is vibrated/acoustically excited. The temperature control module 64 is configured to control the temperature of the heating/cooling plate 70 and accept temperature setting inputs.

Figure 5:
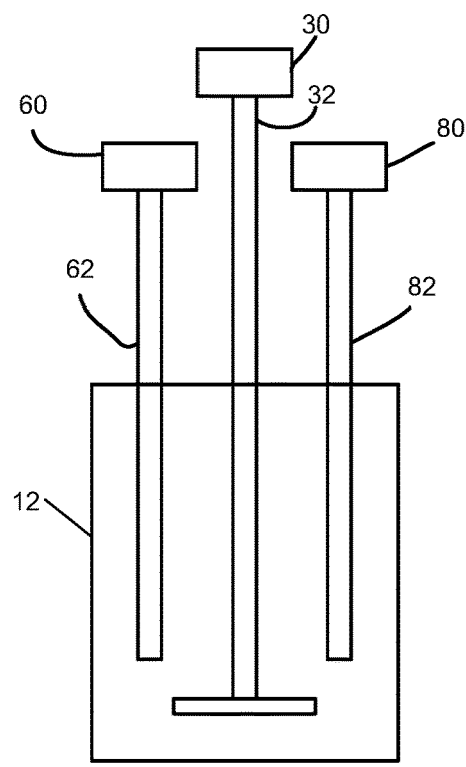
FIG. 5 is a schematic view of another alternate vibration generator and temperature control device in accordance with the present disclosure for the system of FIG. 1.

FIG. 5 illustrates the vibration generator configured as a transducer 80. Extending from the transducer 80 is an acoustic waveguide 82, which extends into the receptacle 12. The acoustic waveguide 82 extends into or proximate to the sample being tested to acoustically excite the sample. The transducer 80 may be any suitable acoustic wave transducer 80 configured to convert electrical energy into mechanical vibrations. The transducer 80 vibrates the waveguide 82 at a frequency/amplitude set using the vibration control module 50. The fixture 16 can be modified in any suitable manner to support the transducer 80 over the receptacle 12 with the waveguide 82 extending from the transducer into the receptacle 12. The transducer 80 in combination with the waveguide 82 is configured to generate at least one of longitudinal acoustic waves, flexural acoustic waves, shear acoustic waves, and torsional acoustic waves.

Figure 6:
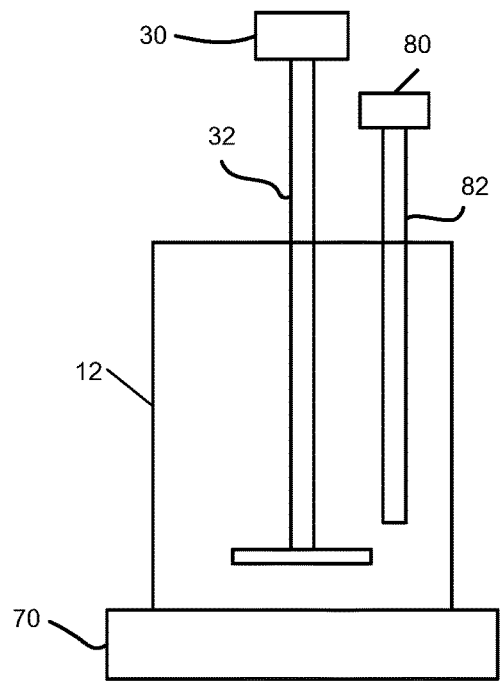
FIG. 6 is a schematic view of another vibration generator and temperature control device in accordance with the present disclosure for the system of FIG. 1.

The configuration of FIG. 5 also includes the heat source 60 and heating coil 62 for heating the sample while the sample is acoustically excited by the transducer 80. FIG. 6 is similar to the configuration of FIG. 5, but the heat source 60 and heating coil 62 is replaced with the heating/cooling plate 70.

Figure 7:
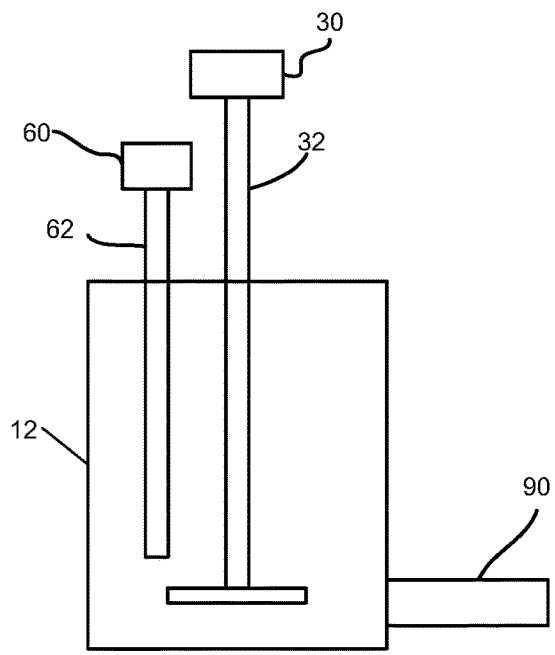
FIG. 7 is a schematic view of an additional vibration generator and temperature control device in accordance with the present disclosure for the system of FIG. 1.

FIG. 7 illustrates the vibration generator configured as a normal beam, shear transducer 90 in contact with a side of the receptacle 12. The transducer 90 may be in direct contact with the side of the receptacle 12, or in contact with the side by way of any suitable intermediate material, such as any suitable ultrasound gel. The fixture 16 can be modified in any suitable manner to support the transducer 90 at the side of the receptacle 12. The transducer 90 indirectly vibrates the sample in the receptacle 12 by vibrating the receptacle 12 at a side thereof.

Figure 8:
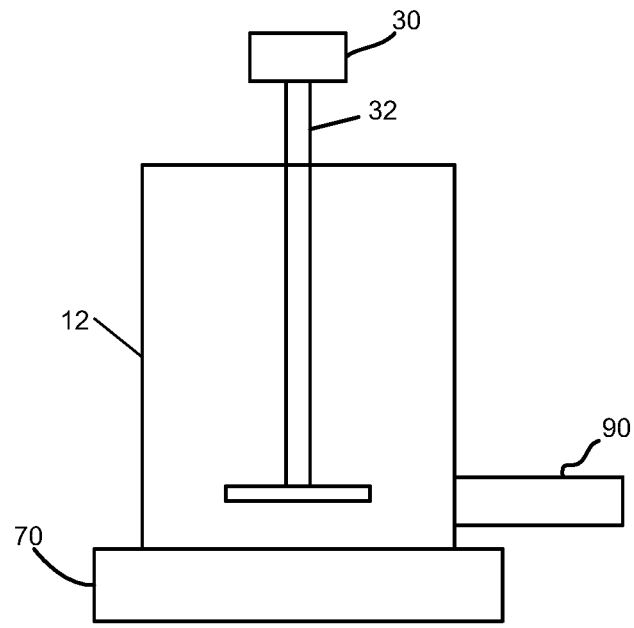
FIG. 8 is a schematic view of another alternate vibration generator and temperature control device in accordance with the present disclosure for the system of FIG. 1.

The configuration of FIG. 7 also includes the heat source 60 and heating coil 62 for heating the sample while the sample is acoustically excited by the transducer 80. FIG. 8 is similar to the configuration of FIG. 7, but the heat source 60 and heating coil 62 is replaced with the heating/cooling plate 70.

Figure 9:
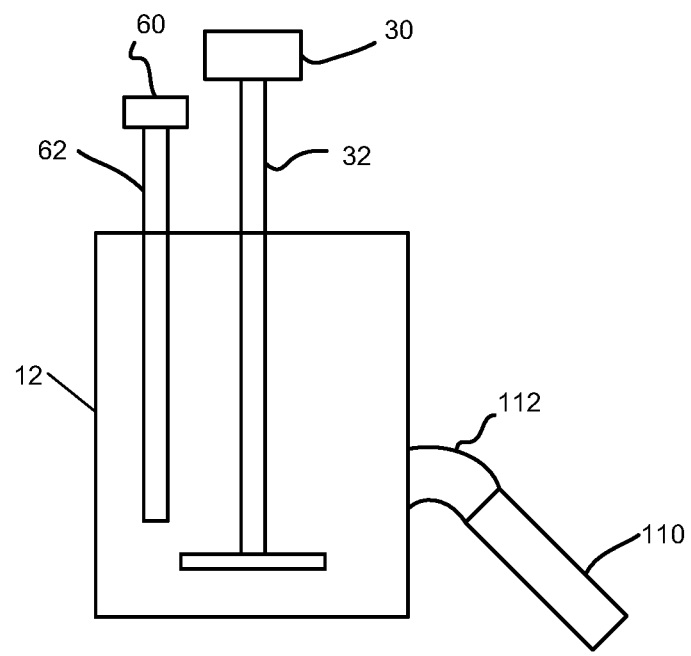
FIG. 9 is a schematic view of an additional vibration generator and temperature control device in accordance with the present disclosure for the system of FIG. 1.

FIG. 9 illustrates the vibration generator configured as an angle beam transducer 110 in acoustical contact with the side of the receptacle 12 by way of a variable angle wedge. The variable angle wedge 112 is made of any material suitable for transmitting vibration from the transducer 110 to the receptacle 12. The wedge 112 may be set at any suitable angle to allow the transducer 110 to be supported at an angle. The fixture 16 may be configured in any suitable manner to support the transducer 110 at a desired angle. By varying the angle of the transducer 110, different angles of acoustical excitation on the sample may be tested.

Figure 10:
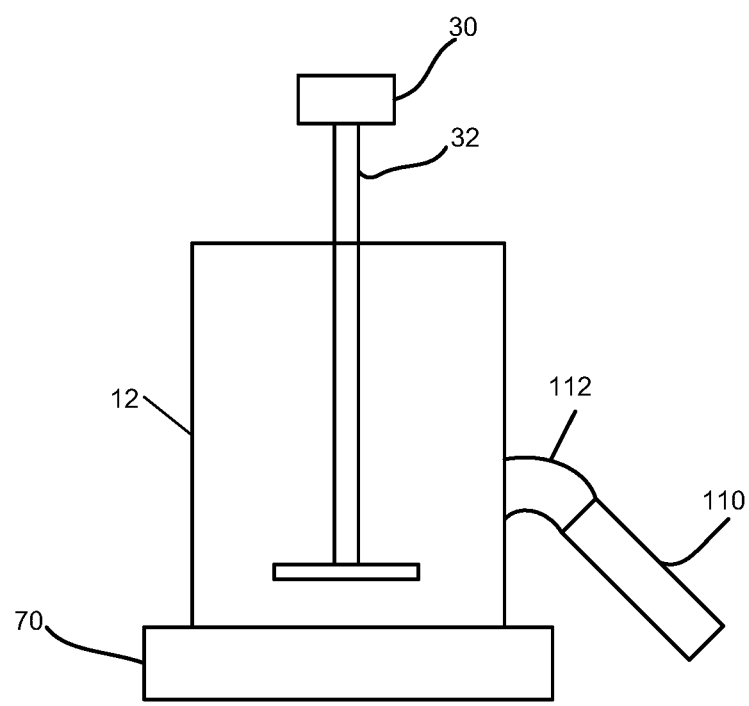
FIG. 10 is a schematic view of another vibration generator and temperature control device in accordance with the present disclosure for the system of FIG. 1.

The configuration of FIG. 9 also includes the heat source 60 and the heating coil 62 for heating the sample while the sample is acoustically excited by the transducer 80. FIG. 10 is similar to the configuration of FIG. 9, but the heat source 60 and heating coil 62 is replaced with the heating/cooling plate 70.

The present disclosure further includes a method for measuring effects of vibration on rheometric properties of a fluid sample. The method may be practiced using the system 10 including any of the features of FIGS. 1-10, or the method may be practiced using any other suitable testing system. With respect to the system 10, the method includes loading a fluid sample into the receptacle 12. The probe 32 of the rheometric measuring device 30 is arranged in the sample, or proximate to the sample. Vibration frequency and amplitude of any of the vibration generators 14, 80, 90, 110 is set using the vibration control module 50 to vibrate/acoustically excite the sample. As the sample is vibrated, rheometric properties of the sample are measured using the rheometric measuring device 30. Any suitable rheometric properties may be measured including, but not limited to viscosity, elasticity, shear etc.

By varying the parameters of the acoustic waves generated by the vibration generators 14, 80, 90, 110, the system 10 of the present disclosure is configured to quantify the acoustic parameters (e.g., frequency, amplitude, etc.) that will increase the flowability of the sample. For example and with respect to adhesives used to join components of a battery module for a hybrid or fully electric vehicle, the adhesives are very thick and highly viscous at room temperature when not subject to vibration, which makes it difficult to apply the adhesives. Using the system 10 of the present disclosure, rheological properties of the adhesives may be tested to identify optimal acoustic parameters for vibrating/acoustically exciting the adhesives to reduce the viscosity thereof, thereby making it easier to apply the adhesives to the battery module. The system 10 may also be used to identify optimal temperature for applying the adhesives by heating or cooling the adhesives as the adhesives are acoustically excited by the vibration generators 14, 80, 90, 110.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for measuring effects of vibration on rheometric properties of a fluid sample, the system comprising:
   a receptacle configured to hold the fluid sample and receive a probe extending from a rheometric measuring device;
   a vibration generator configured to vibrate the fluid sample within the receptacle while the rheometric measuring device measures the rheometric properties of the fluid sample; and
   a vibration control module configured to control frequency at which the vibration generator vibrates.

2. The system of claim 1, further comprising a fixture configured to support the receptacle and the vibration generator.

3. The system of claim 1, wherein the vibration generator includes a vibration shaker having a vibration rod configured to contact an exterior of the receptacle to vibrate the receptacle.

4. The system of claim 3, wherein the vibration rod is configured to contact a bottom of the receptacle.

5. The system of claim 3, wherein the vibration rod is configured to contact a side of the receptacle.

6. The system of claim 1, wherein the vibration generator includes a vibration shaker and a vibration disc supported within the receptacle by a vibration rod extending through a bottom of the receptacle.

7. The system of claim 1, wherein the vibration generator includes a transducer and an acoustic waveguide extending from the transducer into the receptacle, the transducer is configured to generate at least one of longitudinal acoustic waves, flexural acoustic waves, shear acoustic waves, and torsional acoustic waves.

8. The system of claim 1, wherein the vibration generator includes a normal beam, shear transducer in contact with a side of the receptacle.

9. The system of claim 1, wherein the vibration generator includes an angle beam transducer in contact with a side of the receptacle.

10. The system of claim 1, further comprising a heater configured to heat the fluid sample within the receptacle.

11. The system of claim 10, wherein the heater includes a heating coil extending from a heat source into the receptacle to heat the fluid sample.

12. The system of claim 10, wherein the heater includes a hot plate on which the receptacle is seated.

13. The system of claim 1, further comprising a cool plate on which the receptacle is seated, the cool plate configured to cool the fluid sample.

14. The system of claim 1, wherein the rheometric measuring device is one of a rheometer and a viscometer.

15. A system for measuring effects of vibration on rheometric properties of a fluid sample, the system comprising:
 a receptacle configured to hold the fluid sample and receive a probe extending from a rheometric measuring device;
 a vibration generator configured to vibrate the fluid sample within the receptacle while the rheometric measuring device measures the rheometric properties of the fluid sample;
 a fixture to which the vibration generator is mounted, the fixture including a support configured to hold the receptacle relative to the vibration generator such that vibration generated by the vibration generator is transferred to the fluid sample; and
 a vibration control module configured to control frequency at which the vibration generator vibrates.

16. The system of claim 15, wherein the vibration generator includes a vibration shaker mounted to the fixture below the support.

17. The system of claim 16, wherein the vibration shaker includes a vibration rod configured to contact a bottom of the receptacle to vibrate the receptacle and the fluid sample therein.

18. The system of claim 16, wherein the vibration generator includes a vibrating disc supported within the receptacle by a vibration rod extending through a bottom of the receptacle.

19. A method for measuring effects of vibration on rheometric properties of a fluid sample, the method comprising:
 loading the fluid sample into a receptacle;
 inserting into the fluid sample a probe of a rheometric measuring device configured to measure the rheometric properties of the fluid sample;
 setting vibration frequency of a vibration generator configured to vibrate the fluid sample within the receptacle while the rheometric measuring device measures rheometric properties of the fluid sample; and
 measuring with the rheometric measuring device the rheometric properties of the fluid sample while the fluid sample is vibrated by the vibration generator at the set vibration frequency.

20. The method of claim 19, further comprising heating the fluid sample while measuring the rheometric properties of the fluid sample.

\* \* \* \* \*